UNITED STATES PATENT OFFICE.

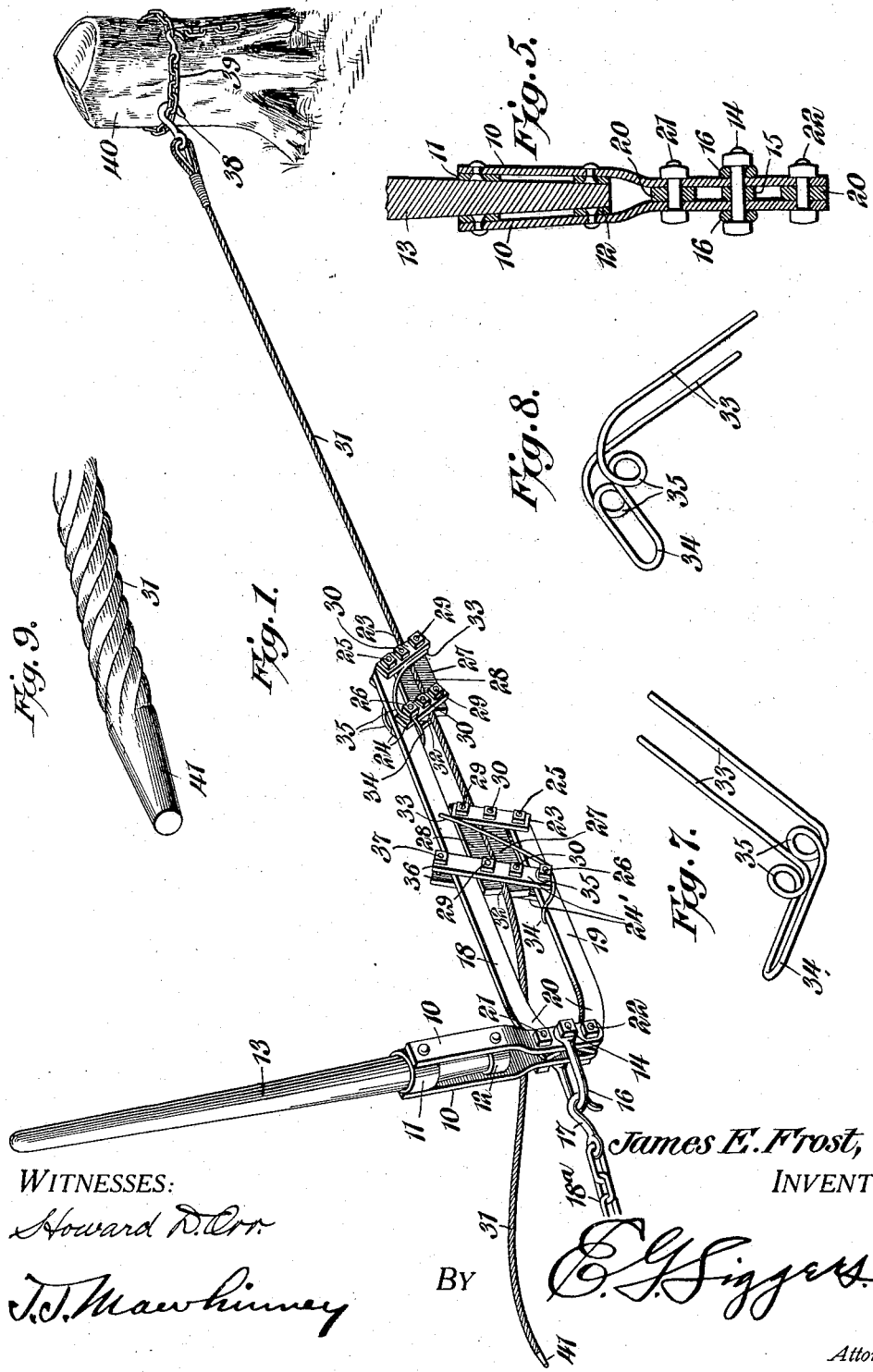

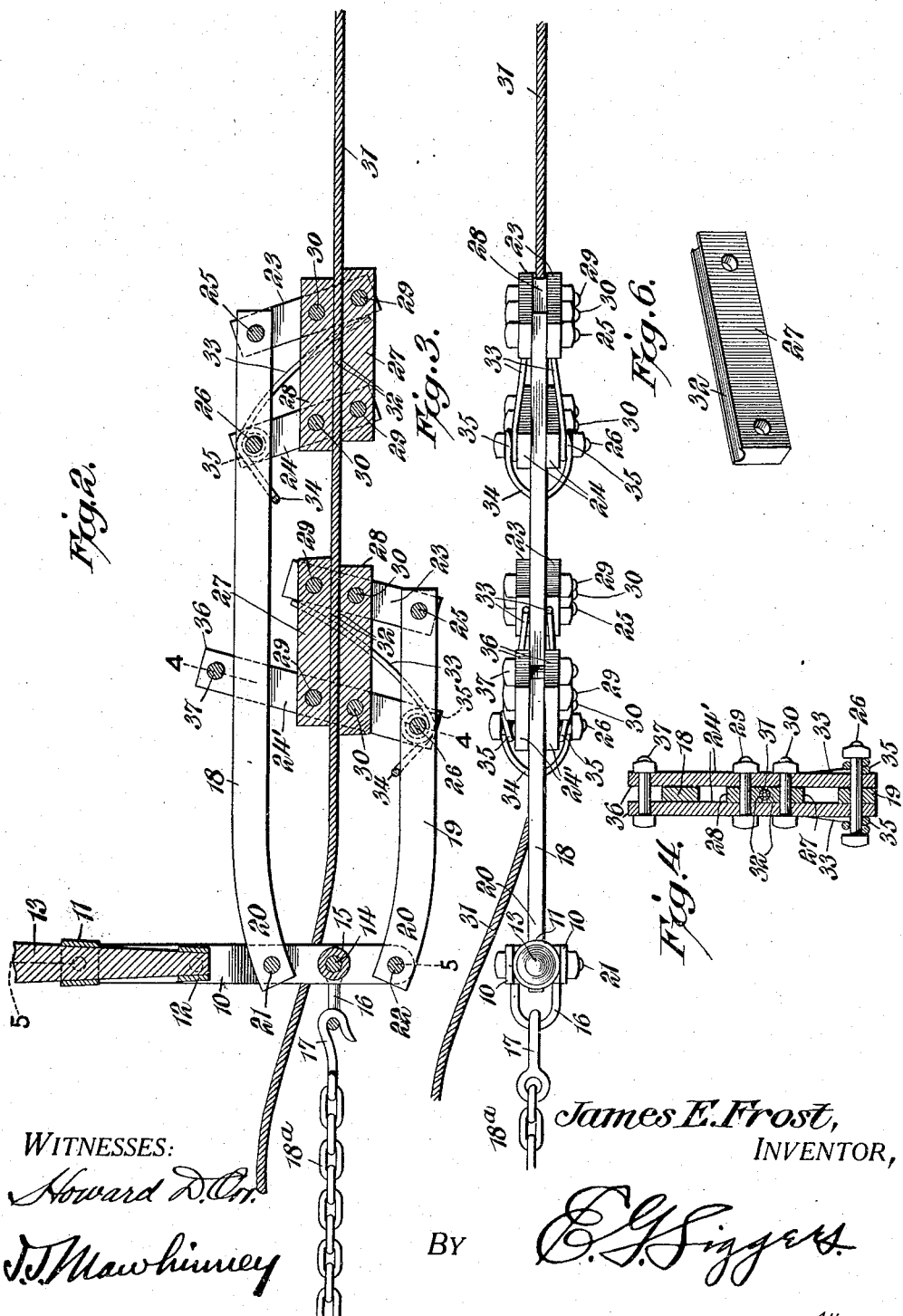

JAMES EDWARD FROST, OF LADYSMITH, WISCONSIN.

PULLING AND STRETCHING DEVICE.

1,202,279.   Specification of Letters Patent.   Patented Oct. 24, 1916.

Application filed December 3, 1915.   Serial No. 64,891.

*To all whom it may concern:*

Be it known that I, JAMES E. FROST, a citizen of the United States, residing at Ladysmith, in the county of Rusk and State of Wisconsin, have invented a new and useful Pulling and Stretching Device, of which the following is a specification.

The present invention has reference to an improved device for pulling and stretching, and has for an object to provide an improved device which may be made relatively small for stretching fences, pulling automobiles out of mud, and the like, and which may be made of sufficient size for drawing stumps of trees out of the ground, and other relatively heavy work.

It is also an important object of this invention to provide a device which is of comparatively simple structure, comprises but few parts, and has the parts so combined and connected that they may be made of considerable strength so as to withstand the strains imparted to them during the use of the device.

Another object of the invention is to provide the gripping jaws of the device with springs of a peculiar construction, and which are mounted in a peculiar way so that the springs may be strong and powerful and at the same time be relatively light in weight and occupy but relatively small space.

A further object of the invention is to provide a device with a pair of grippers, each of which has a pulling arm, and a peculiar connection between the arms for guiding them in their reciprocating movements, and for holding the grippers in true alinement with respect to the draft cable which passes through the grippers, the pulling arms being also used for supporting the springs, which automatically actuate the grippers.

The above and other objects and advantages of this invention will be more particularly brought out in the following description of the present preferred embodiment of the invention, which is disclosed in the accompanying drawings, wherein:

Figure 1 is a perspective view of the improved pulling and stretching device, as applied to a tree stump. Fig. 2 is a longitudinal sectional view, taken through the device, enlarged. Fig. 3 is an upper edge view of the device. Fig. 4 is a vertical sectional view, taken through the device, on the line 4—4 of Fig. 2, and showing in section the inner end of the inner gripping member. Fig. 5 is a vertical sectional view, taken through the device on the line 5—5 of Fig. 2, or longitudinally through the lever and the parts connected thereto. Fig. 6 is a detail perspective view of one of the gripping blocks. Fig. 7 is a detail perspective view, looking down on one side of the spring in the position which it assumes when applied to the inner gripper. Fig. 8 is a detail perspective view of the spring in the position which it assumes when applied to the outer gripper. Fig. 9 is a detail perspective view of the outer end of the draft cable employed.

Referring to the drawings, wherein like parts are designated by similar numerals of reference throughout the several views, it will be noted that the improved device has a lever, the same being formed of a pair of straps 10 between the upper ends of which are riveted, or otherwise suitably secured, a pair of spaced apart socket rings 11 and 12, the latter being preferably of reduced diameter, as compared with the upper ring 11, and both being adapted to receive the inner end of a handle 13, adapted to be grasped in the hand for reciprocating the lever. The lever is anchored or fulcrumed at its lower end upon a transverse bolt or pivot pin 14, the latter passing transversely through the lower ends of the straps 10, and carrying at its intermediate portion a spacing sleeve 15, which is preferably employed for holding apart the lower ends of the straps 10. It will be noted, particularly from Figs. 1 and 5 that the lower ends of the straps 10 are contracted, or are offset inwardly closer together than the upper ends of the straps, and that the said upper ends of the straps slightly diverge, or flare away from one another to accommodate the socket rings 11 and 12, which are of different diameters. The outer ends of the pivot pin 14 carry the opposite ends of a clevis 16 which extends backwardly from the lever and is engaged by a hook 17 carried on the forward end of a chain 18ª. The chain 18ª is adapted to be anchored or secured in any suitable manner to hold the clevis 14 from movement, and thus anchor the lever of the device and provide a fixed fulcrum or pivot point 14 therefor. It will thus be noted that the lever extends slightly below the pivot point 14, and extends considerably above the pivot point 14, the latter portion of the lever constituting the handle and providing for a relatively great leverage for the device. The lever carries a pair of arms 18 and 19. The arm 18 is the long arm, and in the present instance is the upper arm. The arm 19 is the short arm, and is disclosed in the present embodiment as being the lower arm. Each of these arms 18 and 19 is provided upon its outer or forward end with a gripper hereinafter specifically described, the grippers being held in longitudinal alinement between the arms. The arms 18 and 19 are suitably spaced apart in a vertical direction to accommodate the grippers, so that the grippers may be of substantial size and strength. In order to obtain relatively great leverage and at the same time to admit of grippers of substantial size and strength, the inner or rear ends of the arms 18 and 19 are bent or curved toward each other to converge, as at 20, toward the pivotal support 14 of the lever. The inner ends of the arms 18 and 19 are pivotally connected to the lever at the upper and lower sides of the bolt 14, by bolts 21 and 22 respectively, which pass transversely through the straps 10, and through the inner ends of the arms 18 and 19. Thus reciprocation of the lever back and forth moves the upper and lower arms 18 and 19 back and forth past each other to impart movements of the grippers toward and from each other at each reciprocation of the lever.

The grippers, which are carried upon the outer ends of the levers 18 and 19, are of the same formation, each comprising a pair of links 23 and 24, hinged at one end against the opposite sides of the respective arms 18 and 19, by means of bolts 25 and 26. The links 23 and 24 extend inwardly from the bolts 25 and 26 toward the opposite arm, and support between the links a pair of gripping blocks 27 and 28. The gripping block of each gripper is pivotally mounted at its opposite ends between the free ends of each pair of links 23 and 24, bolts 29 holding the blocks 27 pivotally in place. The links 23 and 24 are also hinged by means of bolts 30 to the opposite ends of the gripping block 28, the latter lying between the links 23 and 24 in spaced relation to the link 27, so that when the links 23 and 24 are swung inwardly sufficient space is provided between the gripping blocks 27 and 28 to admit of the free passage of a draft cable 31 between the blocks. As may be seen particularly from Figs. 4 and 6 of the drawings, each gripping block is provided in its inner edge with a longitudinal groove or face 32 adapted to fit against the side of the draft cable 31, for binding about the cable, when the blocks 27 and 28 are contracted, and hold the cable from slipping through the gripper. This peculiar mounting of the gripping blocks 27 and 28 moves the same toward and from each other, as the links 23 and 24 are swung outwardly and inwardly to thus alternately release and clamp the draft cable 31 in the gripper. The grippers are normally urged into closed or gripping position by springs 33. Each gripper has a spring, the spring comprising a length of resilient wire bent into substantially U-shape to provide a loop 34 adapted to engage over the inner edge of the arm 18, or the arm 19, as is clearly shown in Figs. 1 and 2 of the drawings. These loops 34 terminate in coils 35 which comprise the looped over intermediate portions of the arms of the springs, and form eyes through which the opposite ends of the adjacent pivot bolts 26 pass in order to hold each loop 34 over the inner edge of the adjacent arm. The free ends of the spring 33 pass from the coils 35 inwardly against the opposite sides of the blocks 27 and 28 and bear at their free ends against the inner edges, and at the outer ends, of the outer links 23 of each gripper, so as to yieldingly and normally urge the links into an outwardly swung position to bind the gripping blocks 27 and 28 against the opposite sides of the draft cable 31. It will thus be seen, that the arms 18 and 19 serve as stops or supports for the springs 33, and that they hold the springs always under tension to urge the grippers into closed position.

Means is provided upon the arms 18 and 19 for holding them at all times in longitudinal alinement with the direction of pull of the device, it being understood that only one of the grippers at a time actually draws upon the draft cable 31, so that the opposite gripper is free to vibrate laterally and to possibly fall, should there be sufficient slack in the draft cable 31, during the initial movements of the device. This guiding means for the arms 18 and 19 in the present instance comprises the elongation or co-extension of the inner links $24^1$ of the inner gripper, the extension 36 of the links comprising a guide on the outer or free ends of the links which passes against the opposite sides of the arm 18 to hold the arm 18 from lateral displacement with respect to the inner arm 19, the arm 18 being supported from downward swinging by the outer block 27 of the inner gripper. The arm 18 is also held from upward swinging movement, and the arm 19 with its gripper is held from downward swinging movement by means of a transverse pin or bolt 37, which connects the upper ends of the extensions 36, so as to entirely house the arm 19 from movement either vertically or laterally, and at the same time to admit of the free reciprocation of the arm 18 through the guide.

The draft cable 31 is of any desired length for the work for which the improved device is to be adapted. The outer end of the draft cable 31 is provided with a hook 38, or other attaching device, which is engaged with a chain 39, or the like, which is passed about the stump 40. The inner end of the draft cable 31, which cable is preferably metal, is welded together to provide an integral point 41 in order to hold the strands of the cable 31 together, and admit of the easy threading of the cable 31 through the grippers, and to also admit of the easy withdrawal of the cable from the grippers. This integral formation of the outer end of the wire cable also holds the cable together and prevents the unwinding and consequent destruction of the cable in use.

In use, the outer end of the draft cable 31 is secured to the motor vehicle, the stump 40, or to any other device which is to be moved, for pulling it, or stretching it. The lever is anchored from movement toward the stump 40, as disclosed in the drawings by the chain 18ª, so that the lever is free to swing about the pivot bolt 14 to actuate the device. The inner end 41 of the draft cable is threaded in between the blocks 27 and 28 from the outer end of the device inwardly, the cable passing through both of the grippers and being held in longitudinal alinement thereby with respect to the lever and the stump 40. The handle 13 is now reciprocated back and forth to reciprocate the arms 18 and 19 in opposite directions with respect to each other, and to thus carry the grippers toward and from each other. The forward movement of one gripper partially separates the blocks 27 and 28 thereof by the frictional contact of the blocks against the draft cable 31, the springs 33 being of sufficient lightness to admit of this partial separation of the blocks and thus admit of the relatively easy and free forward movement of the gripper over the cable. The rearward movement of each gripper, however, results in the binding together of the blocks 27 and 28 against the opposite sides of the cable 31 as the springs 33 urge the links 23 and 24 outwardly to contract the gripping blocks, the friction of the blocks against the cable 31 instead of acting against the spring, acting with the spring and thus insuring the binding of the blocks against the cable. As the inwardly converging ends 20 of the arms 18 and 19 are located at a relatively short distance from the opposite sides of the pivot bolt 14, it is seen that considerable leverage is had by this arrangement, and that as the handle 13 is given considerable length, relatively slight pressure on the handle 13 results in a relatively great working stress or pull of the grippers.

As has been before pointed out, the important features of the invention are in the improved guide for holding the arms 18 and 19 from separation vertically, and to hold them in alinement from lateral displacement; the simplified form and mounting of the springs which urge the grippers in the normally closed position; and the peculiar connection between the arms 18 and 19 and the lever to produce a relatively great leverage upon the grippers.

It is within the spirit of the invention to make such changes and modifications in the above specifically described embodiment of the invention as may be found necessary and desirable in the manufacture of the device, and for the various adaptations or applications of the device to different kinds of work for which it is designed, such changes and modifications being restricted only by the scope of the following claims.

What is claimed is:—

1. In a pulling and stretching device, a lever, a pair of arms projecting forwardly from the lever and adapted to be reciprocated thereby, a gripper on each arm, each gripper comprising spaced apart pairs of links hinged upon the adjacent arm, and spaced apart gripping blocks hinged at their opposite ends between the free ends of said links, said grippers being arranged in longitudinal alinement, the inner pair of links of the inner gripper being extended longitudinally for engagement against the opposite sides of the opposite arm for holding the same from lateral displacement, and a transverse pin carried through the outer ends of the link extensions to engage the outer edge of the opposite arm to hold the same from swinging away from the first arm.

2. In a pulling and stretching device, a pair of arms, means for reciprocating the arms with respect to each other, and a gripping member carried upon each arm, each gripping member comprising a pair of spaced apart links hinged upon the arm, pairs of spaced apart gripping blocks hinged at their opposite ends between the free ends of said links, and a U-shaped spring engaging at its inner looped end over the inner edge of the arm and having coils at the ends of said inner looped end for engagement upon the pivotal support of the inner pair of links, the free ends of said spring extending inwardly and forwardly for engagement against the inner edges of the outer pair of links to yieldingly urge the same forwardly to close said gripping blocks.

3. In a pulling and stretching device, a flat arm, spaced pairs of links hinged against the opposite sides of said flat arm, bolts passing through the inner ends of said links to pivotally connect them to the arm, gripping blocks carried in the free ends of said links, and a U-shaped spring engaging over the edge of said arm and having transversely registering helices pivotally engaging upon the adjacent pivot bolt, the free ends of said U-shaped spring bearing against the inner edges of the outer pair of links for yieldingly urging both pairs of links outwardly into gripping position.

4. In a pulling and stretching device, a lever, a support connected to the lower end of the lever, a short arm hinged to the lever below the support, a long arm hinged to the lever above said support, a pair of links hinged to the outer extremity of each of said arms and extending inwardly toward the opposite arm, a second pair of links hinged to each arm and spaced inwardly from the first pair of links, the inwardly spaced links of the shorter arm having longitudinal extensions for engagement with the long arm to hold the same from swinging upwardly from and out of vertical alinement with the shorter arm, and a pair of gripping blocks carried by the inner and outer pairs of links of each arm, said lever being adapted to be swung about said support to reciprocate the long and short arms and move said gripping blocks toward and from each other.

In testimony that I claim the foregoing as my own, I have hereto affixed my signature in the presence of two witnesses.

JAMES EDWARD FROST.

Witnesses:
S. L. CHICKER,
G. RALPH DAVIS.

Copies of this patent may be obtained for five cents each, by addressing the "Commissioner of Patents, Washington, D. C."